United States Patent [19]
Nishikawa et al.

[11] Patent Number: 5,900,465
[45] Date of Patent: May 4, 1999

[54] HOT MELT ADHESIVE COMPOSITION COMPRISING HYDROGENATED BLOCK COPOLYMERS

[75] Inventors: Makoto Nishikawa, Hasaki-machi; Hideo Takamatsu, Kashima; Mizuho Maeda, Hasaki-machi; Hiromichi Nakata, Kamisu-machi; Yoshio Hirayama, Azuma-machi, all of Japan

[73] Assignee: Kuraray Co., Ltd., Kurashiki, Japan

[21] Appl. No.: 08/767,529

[22] Filed: Dec. 16, 1996

[30] Foreign Application Priority Data

Dec. 14, 1995 [JP] Japan ................................. 7-346919

[51] Int. Cl.⁶ .......................... C08L 9/00; C08L 47/00; C08L 53/00
[52] U.S. Cl. ........................ 525/98; 525/314; 525/315
[58] Field of Search ........................ 525/314, 315, 525/98

[56] References Cited

U.S. PATENT DOCUMENTS

| | | | |
|---|---|---|---|
| 3,265,063 | 8/1966 | Hassell et al. | 525/314 |
| 5,292,819 | 3/1994 | Diehl et al. | 525/314 |
| 5,438,102 | 8/1995 | Brandes et al. | 525/314 |
| 5,460,739 | 10/1995 | Rhodes et al. | 252/43 |
| 5,491,193 | 2/1996 | Erickson et al. | 525/65 |
| 5,530,068 | 6/1996 | Coolbaugh et al. | 525/314 |
| 5,532,319 | 7/1996 | Asahara et al. | 525/89 |
| 5,543,469 | 8/1996 | Struglinski et al. | 525/314 |
| 5,596,041 | 1/1997 | Hashiguchi et al. | 525/98 |
| 5,612,436 | 3/1997 | Halasa et al. | 526/337 |
| 5,686,535 | 11/1997 | Erickson et al. | 525/314 |
| 5,717,035 | 2/1998 | Coolbaugh et al. | 525/314 |

FOREIGN PATENT DOCUMENTS

| | | |
|---|---|---|
| 0 564 050 | 10/1993 | European Pat. Off. |
| 0 632 074 | 1/1995 | European Pat. Off. |
| 6-306128 | 11/1994 | Japan. |

OTHER PUBLICATIONS

Database—Chemical Abstracts, AN–125:87512 and WO 96/16091, May 30, 1996.

Encyclopedia of Polymer Science and Engineering, vol. 1, pp. 548–549, vol. 7, pp. 774–776. J Wiley and Sons, New York, 1987.

*Primary Examiner*—Jeffrey C. Mullis
*Attorney, Agent, or Firm*—Oblon, Spivak, McClelland, Maier & Neustadt, P.C.

[57] ABSTRACT

An adhesive composition suitable for a hot melt adhesive or hot melt pressure-sensitive adhesive, which comprises a block copolymer (a) and a tackifier (b), wherein said block copolymer (a) has at least one polymer block A being a hydrogenated butadiene polymer block having a 1,2-bond content of 20 mol % or less and at least one polymer block B substantially having an olefin polymer structure different from the polymer block A and having a glass transition temperature of −20° C. or less and a heat of crystalline fusion of 8 cal/g or lower, and containing the polymer block A before hydrogenation in an amount of 3 to 80 wt. %.

8 Claims, No Drawings

HOT MELT ADHESIVE COMPOSITION COMPRISING HYDROGENATED BLOCK COPOLYMERS

BACKGROUND OF THE INVENTION

1. Field of the Invention

This invention relates to an adhesive composition suitable for a hot melt adhesive or a hot melt type pressure-sensitive adhesive. The adhesives composition of the present invention exhibits excellent properties such as process stability, adhesion, creep resistance, flexibility at low temperature and solvent resistance so that it can be used in a variety of applications such as, for example, packaging, bookbinding, plywood construction, woodworking, making shoes, adhesion of textile goods and production of various adhesive goods such as various kinds of adhesive tapes and labels.

2. Description of the Background

Solvent type adhesives have been widely used in various applications. The solvent type adhesive has, however, the problems of air pollution, danger of a fire, worsening of the labor environment and industrial hygiene because it usually contains an organic solvent as the solvent. Recently, therefore, solvent-free adhesives have come to be used widely as a substitute for solvent type adhesives. Examples of solvent-free adhesives include aqueous adhesives and hot melt adhesives. Of these, hot melt adhesives are preferably used because they require no drying time or no drying apparatus, and provide excellent energy savings, as well as working properties and productivity.

Also, pressure-sensitive adhesives as a type of adhesive are known. Adhesive goods which have a layer of a pressure-sensitive applied to a base material such as tape, film or sheet of paper, cloth or plastic are used in a wide variety of applications as adhesive tapes, adhesive films and adhesive sheets. In the production of such adhesive goods having a pressure-sensitive adhesive layer, it is common practice to apply a solution of the pressure-sensitive adhesive in an organic solvent to a base material, and then remove the organic solvent, to form the pressure-sensitive adhesive layer on the base material. However, pressure-sensitive adhesives also present problems of air pollution, danger of fire and worsening of the labor environment and industrial hygiene, because of the use of an organic solvent. Under such circumstances, a solvent-free pressure-sensitive adhesive has been required from the viewpoints of safety, working properties and energy saving. To meet the above requirements, a hot melt pressure-sensitive adhesive, which can be applied to a base material without an organic solvent, has been developed.

For the hot melt adhesive and hot melt pressure-sensitive adhesive, a thermoplastic polymer, which can be melted by heating, is used as the base polymer. Examples of the base polymer used for the hot melt adhesive include ethylene-vinyl acetate copolymers, ethylene-α-olefin copolymers, polyamides, polyesters and block copolymers comprising the polymer block of an aromatic vinyl compound and the polymer block of a conjugated diene such as styrene-butadiene-styrene block conjugated diene such as styrene-butadiene-styrene block copolymer or styrene-isoprene-styrene block copolymer. Examples of the base polymer used for the hot, melt pressure-sensitive adhesive include ethylene-vinyl acetate copolymers, block copolymers comprising the polymer block of an aromatic vinyl compound and the polymer block of a conjugated diene, and acrylate-based polymers.

Among the above-exemplified base polymers, an ethylene-vinyl acetate copolymer is used widely as a base polymer for hot melt adhesives or hot melt pressure-sensitive adhesive, because of its toughness, its good adhesion to various base materials such as paper, wood, plastics and metal, its good compatibility with other components (tackifier, wax, softening agent or the like) and its excellent hot melt flowability and thermal stability. However, the ethylene-vinylacetate copolymer has the problem that, because of its insufficient flexibility at low temperatures, the products which use a hot melt adhesive employing the ethylene-vinyl acetate copolymer as the base polymer or adhesive goods having a layer of a hot melt pressure-sensitive adhesive employing the ethylene-vinyl acetate copolymer as a base polymer are not suited for use at low temperatures.

Compared with the ethylene-vinyl acetate copolymer, polyamides and polyesters have lower compatibility with other components of an adhesive such as tackifiers, and, moreover, exhibit inferior handling properties and adhesion to various base materials.

A block copolymer, which is not hydrogenated, comprising the polymer block of an aromatic vinyl compound and the polymer block of a conjugated diene, on the other hand, has been used widely as a base polymer for a hot melt adhesive or hot melt pressure-sensitive adhesive because of its comparatively good adhesion and tackiness at room temperature. Such a block copolymer is, however, considerably inferior in its heat aging resistance and weatherability, because it contains an unsaturated carbon—carbon double bond derived from a conjugated diene in its molecule. A hydrogenated product of the block copolymer comprising the polymer block of an aromatic vinyl compound and the polymer block of a conjugated diene is sometimes used for a hot melt adhesive or hot melt pressure-sensitive adhesive as a base polymer with improved heat aging resistance and weatherability. Since such a hydrogenated block copolymer product cannot be applied to a base material at low temperature because of its high melt viscosity, it is difficult to apply the hydrogenated product to a base material having a low heat deformation temperature such as a polyethylene film or unwoven fabric made of polyethylene. In addition, the melt viscosity of the hydrogenated product changes significantly with only slight changes in temperature. Thus, the hydrogenated product possesses inferior process stability and is significantly limited in its processing conditions for the preparation of an adhesive composition comprising the hydrogenated product.

SUMMARY OF THE INVENTION

Accordingly, one object of the present invention is to provide an adhesive composition suitable as a hot melt adhesive or hot melt pressure-sensitive adhesive, which composition has excellent flexibility at low temperature, good compatibility with a variety of the additives used in various hot melt adhesive compositions, a comparatively low melt viscosity to permit easy coating work at low temperature, small change of the melt viscosity at different temperatures, excellent process stability, and excellent adhesion, tack and cohesion.

Briefly, this object and other objects of the present invention as hereinafter will become more readily apparent can be attained by a block copolymer comprising a specific hydrogenated butadiene polymer block and a specific olefin polymer block which has excellent compatibility with tackifiers and other components used in hot melt adhesives and hot melt pressure-sensitive adhesives. A composition obtained by blending a tackifier with the block copolymer, as a base polymer, has good flexibility at low temperature, exhibits small changes in melt viscosity over significant differences of temperature and, therefore, exhibits excellent process stability. The composition is suitable for use as a hot melt adhesive or hot melt pressure-sensitive adhesive.

The adhesive composition of the present invention comprises a block copolymer (a) and a tackifier (b) wherein:
 (i) the block copolymer (a) has at least one polymer block A comprising a hydrogenated butadiene polymer and at least one polymer block B comprising a polymer substantially having an olefin polymer structure different from polymer block A;
 (ii) the polymer block A in the block copolymer (a) is a hydrogenated butadiene polymer having a 1,2-bond content of 20 mol % or less before hydrogenation;
 (iii) the polymer block B in block copolymer (a) has a glass transition temperature of −20° C. or less and a heat of crystalline fusion of 8 cal/g or lower; and
 (iv) in the block copolymer (a), the content of the polymer block A before hydrogenation is 3 to 80 wt. % based on the weight of the block copolymer (a) before hydrogenation.

DETAILED DESCRIPTION OF THE PREFERRED EMBODIMENTS

The term "adhesive" or "adhesive composition", as used hereinafter means an adhesive or adhesive composition including a pressure-sensitive adhesive or a pressure-sensitive adhesive composition, respectively.

The term "hot melt adhesive" or "hot melt adhesive composition", as used hereinafter, means an adhesive or adhesive composition which is used for adhesion which is effected by melting an adhesive or adhesive composition by heating, applying it to an adherend in a molten state and then solidifying it at low temperature. The term "pressure-sensitive adhesive" or "pressure-sensitive adhesive composition", as used hereinafter, means an adhesive or adhesive composition which carries out pressure sensitive adhesion with tack. The term "hot melt pressure-sensitive adhesive" or "hot melt pressure-sensitive adhesive composition" as used hereinafter means an adhesive or adhesive composition which, upon production of adhesive goods such as adhesive tapes and adhesive sheets by applying an adhesive or adhesive composition to a base material such as paper, cloth or plastic film, is capable of forming a layer of the pressure-sensitive adhesive or pressure-sensitive adhesive composition on the base material by applying it to the base material as a hot-melt.

The adhesive composition provided by the present invention comprises a specific block copolymer (a) as a base polymer and a tackifier (b).

In the adhesive composition provided by the present invention, the block copolymer (a) has the following features:
 (i) the block copolymer (a) has at least one polymer block A (hereinafter simply referred to as "block A") comprising a hydrogenated butadiene polymer and at least one polymer block B (hereinafter simply referred to as "block B") comprising a polymer substantially having an olefin polymer structure different from block A;
 (ii) block A in the block copolymer (a) has a 1,2-bond content of 20 mol % or less before hydrogenation;
 (iii) block B in the block copolymer (a) has a glass transition temperature of −20° C. or less and a heat of crystalline fusion of 8 cal/g or less; and
 (iv) the content of the polymer block A in the block copolymer (a) before hydrogenation is 3 to 80 wt. % based on the weight of the block copolymer (a) before hydrogenation.

There are two types of butadiene polymerization, which are 1,4-bond polymerization in which the four carbon atoms of butadiene are all incorporated in the main chain of the polymer and 1,2-bond polymerization in which only two carbon atoms of butadiene are incorporated in the main chain of the polymer and the remaining two carbon atoms become side chains or branched chains. In the adhesive composition of the present invention, it is necessary that block A in the block copolymer (a) have a 1,2-bond content of 20 mol % or less before hydrogenation [feature (ii)]. If the 1,2-bond content of block A before hydrogenation (hereinafter the block A before hydrogenation is simply referred to as "unhydrogenated block A") exceeds 20 mol %, the tendency of block copolymer (a) to crystalize is reduced and the resulting adhesive composition has poor cohesion and cannot provide good adhesion. In order to provide an adhesive composition having excellent adhesion, the unhydrogenated block A preferably has a 1,2-bond content of 15 mol % or less.

With the objective of providing an adhesive composition which has excellent adhesivity and also excellent heat aging resistance and weatherability, block A has a degree of hydrogenation which is preferably not lower than 70%, more preferably not lower than 80%.

Block B, which is another component of the block copolymer (a), is required to be a polymer block different from block A and which has a substantial olefin polymer structure. The term "block B substantially having an olefin polymer structure" as used herein means that block B is formed of a polymer of isobutylene, propylene, ethylene or another α-olefinic compound and/or is substantially formed of a polymer available by hydrogenation of a polymer of a conjugated diene such as isoprene, 2,3-dimethyl-1,3-butadiene, 1,3-pentadiene, 1,3-hexadiene or butadiene. It has a structure substantially similar to that of a polymer available by the polymerization of an α-olefin.

The block of a hydrogenated butadiene polymer is classified as "a polymer block substantially having an olefin polymer structure". It is, however, structurally necessary that block copolymer (a) of the adhesive composition of the present invention have a block B comprising a polymer block different from block A, so that the block of hydrogenated butadiene polymer having a 1,2-bond content of 20 mol % or less is not included in block B.

Block B is formed of one or more compounds selected from the group consisting of the above-described α-olefins and conjugated dienes unless it is the block of a hydrogenated butadiene polymer having a 1,2-bond content of 20 mol % or less. Here, when a conjugated diene is employed, it is necessary that block B acquire an olefin polymer structure by hydrogenation. When block B is formed of at least two of the above-described compounds, it can have a random, block or taper structure. Among them, a random structure is preferred.

In addition, block B can be formed of a polymer block such as an alternating copolymer of ethylene and propylene, a random copolymer of ethylene and propylene, a random copolymer of ethylene and isobutylene, a hydrogenated isoprene polymer or a hydrogenated copolymer of isoprene and butadiene. Preferably, block B is formed of a hydrogenated isoprene polymer or hydrogenated copolymer of isoprene and butadiene, from the viewpoint of adhesivity of the adhesion of the resulting adhesive composition.

If block B is formed of a conjugated diene such as butadiene or isoprene, block B preferably has a 1,2-bond and 3,4-bond content of 50 mol % or less before hydrogenation, with a view to providing an adhesive composition having good low temperature characteristics. If block B is formed of a conjugated diene such as butadiene or isoprene, the degree of hydrogenation is preferably 70% or higher, more preferably 80% or higher, with a view to providing an adhesive composition having excellent heat aging resistance and weatherability.

Block B can contain a small amount, generally less than 30 wt. %, of a structure different from an olefin polymer structure, for example, a structure in which the conjugated diene has not been hydrogenated, or a structure which is derived from a monomer different from an olefinic compound or conjugated diene.

In the present invention, it is necessary that block B of block copolymer (a) have a glass transition temperature of —20° C. or less and a heat of crystalline fusion of 8 cal/g or less [feature (iii)]. If block B, has a glass transition temperature higher than −20° C., the elastomeric properties of the block copolymer (a) are lowered. and the resulting adhesive composition has poor flexibility at low temperature. If block B has a heat of crystalline fusion exceeding 8 cal/g, the block copolymer (a) has poor flexibility at room temperature and poor low temperature characteristics, and embrittlement occurs in the resulting adhesive composition at low temperature. It is desired, for example, to adjust the content of alkyl branching or the like in block B in order to have the glass transition temperature and heat of crystalline fusion of block B fall within the above range.

In order to impart to the adhesive composition better flexibility and low temperature characteristics, the glass transition temperature and heat of crystalline fusion of block B are not higher than −30° C. and not higher than 5 cal/g, respectively.

The term "glass transition temperature of block B" as used herein means the value of the glass transition temperature of block B as measured by DSC (differential scanning calorimetry). (The determination of glass transition temperature is described below.) The term "heat of crystalline fusion of block B", as used herein, means the value of the heat of crystalline fusion of block B as measured also by DSC.

For the adhesive composition of the present invention, it is necessary that the content of the polymer block A in the block copolymer (a) before hydrogenation be 3 to 80 wt. % based on the weight of the block copolymer (a) before hydrogenation [feature (iv)]. If the content of the polymer block A before hydrogenation is less than 3 wt. % in block copolymer (a) before hydrogenation, the resulting adhesive composition has little cohesion and cannot provide good adhesion. If the content of the polymer block A before hydrogenation exceeds 80 wt. % of the block copolymer (a) before hydrogenation, the resulting adhesive composition exhibits poor flexibility and, when used as a pressure-sensitive adhesive, cannot play the function of a pressure-sensitive adhesive because of its low adhesivity. The content of the polymer block A before hydrogenation in the block copolymer (a) before hydrogenation preferably falls within a range of from 5 to 70 wt. %.

No particular limitation is imposed on the molecular weights of block A and block B in the block copolymer (a) and also the molecular weight of the block copolymer (a). From the viewpoint of providing an adhesive composition having good processability, however, the unhydrogenated block A should have a number-average molecular weight preferably of 2,500 to 200,000, more preferably of 3,000 to 50,000; block B should have a number-average molecular weight preferably of 3,000 to 300,000, more preferably of 30,000 to 200,000; and the block copolymer (a) should have a number-average molecular weight, preferably of 10,000 to 1,000,000, more preferably of 20,000 to 300,000.

No particular limitation is imposed on the number or bonding form of block A and block B in the block copolymer (a) insofar as the block copolymer (a) has at least one block A and at least one block B. Block A and block B can be bonded linearly or in branched form including the radial form.

The block copolymer (a) can, for example, have a linear or branched structure represented by the following formulas:

A-(B-A)$p$,

B-(A-B)$q$, (A-B)$r$, or (A-B)$s$-X wherein A represents block A; B represents block B; p,q and r each represents an integer of 1 or greater; s represents an integer of 2 or greater and X represents a residue derived from a coupling agent. It should, however, be understood that the structure of the block copolymer (a) is not limited to the above formulas.

Of these, the block copolymer (a) with a linear triblock structure represented by the formula: A-B-A is preferred from the viewpoint of the cohesivity of the resulting adhesive. composition.

The block copolymer (a) can have a functional group such as a carboxyl group, an acid anhydride group, a hydroxyl group, an epoxy group, an amino group or a halogen atom at a terminal of the molecule and/or in the molecular chain.

No particular limitation is imposed on the preparation process of block copolymer (a). The block copolymer (a) can be prepared by forming an unhydrogenated block copolymer comprising unhydrogenated block A and unhydrogenated block B through anionic polymerization, cationic polymerization, polymerization in the presence of a Ziegler catalyst, single site polymerization, radical polymerization or the like, and then subjecting the unhydrogenated block copolymer to hydrogenation in an appropriate manner.

For example, the block copolymer (a) can be prepared by (1) forming an unhydrogenated block copolymer comprising unhydrogenated block A and unhydrogenated block B by sequential addition of monomers constituting each block for polymerization using, as a polymerization initiator, an alkyllithium compound having a $C_{1-10}$-alkyl group, preferably methyl lithium, ethyl lithium, pentyl lithium or butyl lithium or forming an unhydrogenated block copolymer comprising unhydrogenated block A and unhydrogenated block B through a coupling method with a coupling agent such as dichloromethane, dibromomethane, dichloroethane, dibromoethane, dibromobenzene or phenyl benzoate; (2) subjecting the unhydrogenated block copolymer obtained in the above step (1) to hydrogenation by a known method, e.g. by reaction with hydrogen in the presence of a hydrogenation catalyst such as Raney nickel, a heterogeneous catalyst in which a metal such as Pt, Pd, Ru, Rh or Ni is supported on a carrier such as carbon, alumina or kieselguhr, or a Ziegler-type catalyst composed of a transition metal and an alkylaluminum compound or alkyllithium compound; and then (3) recovering the hydrogenated block copolymer obtained.

In the above-described process for preparing block copolymer (a), the polymerization reaction in step (1) is preferably conducted with a polymerization initiator in an amount of 0.01 to 0.2 part by weight per 100 parts by weight of all the monomers in an organic solvent which is inert to the polymerization initiator, preferably, an aliphatic hydrocarbon or aromatic hydrocarbon having 6 to 12 carbon atoms, such as hexane, heptane, cyclohexane, methylcyclohexane or benzene at 0° C. to 80° C. for 0.5 to 50 hours.

The hydrogenation reaction described in step (2) supra is conducted at a reaction temperature ranging from ordinary temperature to 250° C. for 1 to 100 hours under a hydrogen pressure ranging from normal pressure to 200 kg/cm². The block copolymer (a) obtained can be recovered by adding methanol or the like to the reaction mixture to permit the block copolymer (a) to coagulate and then drying the block copolymer (a) by heating or subjecting to reduced pressure; or by pouring the reaction mixture into hot water to remove the solvent azeotropically and then drying the block copolymer (a) as described above.

The adhesive composition provided by the present invention contains a tackifier (b) together with the block copolymer (a). The tackifier (b) is used mainly for imparting hot tack to the adhesive composition, and, at the same time, lowering its melt viscosity to improve its properties for working such as coating. In the adhesive composition of the present invention, the tackifier conventionally employed either in a hot melt adhesive or hot melt pressure-sensitive adhesive can be used as the tackifier (b).

Examples of the tackifier (b) used in the adhesive composition of the present invention include cumarone-indene resins, phenol resins, p-t-butylphenol-acetylene resins, phenol-formaldehyde resins, terpene-phenol resins, polyterpene resins, xylene-formaldehyde resins, aromatic hydrocarbon resins, aliphatic hydrocarbon resins, oligomers of mono-olefin or di-olefin, hydrogenated terpene resins, hydrogenated aromatic hydrocarbon resins, hydrogenated aliphatic hydrocarbon resins, alicyclic saturated hydrocarbon resins, polybutene, polyhydric alcohol esters of rosin, hydrogenated rosins, and esters of hydrogenated rosins with a monoalcohol or a polyhydric alcohol. These tackifiers can be used either singly or in combination. Of these, hydrogenated terpene resins, hydrogenated aliphatic hydrocarbon resins, hydrogenated aromatic hydrocarbon resins and alicyclic saturated hydrocarbon resins are preferably used as the tackifier (b).

In the adhesive composition of the present invention, with a view to providing an adhesive composition having excellent adhesion and tack together with excellent low temperature flexibility and cohesion, the tackifier (b) is used preferably in an amount of 10 to 2000 parts by weight, more preferably in an amount of 40 to 500 parts by weight, based on 100 parts by weight of the block copolymer (a).

The adhesive composition comprising the block copolymer (a) and the tackifier (b) generally has a tack at ordinary temperature and, therefore, can be used sufficiently, as it is, as a hot melt pressure-sensitive adhesive. In addition, this adhesive composition has excellent adhesivity so that it can be used as a hot melt adhesive. When used as a hot melt pressure-sensitive adhesive, a softening agent which has conventionally been employed in a pressure-sensitive adhesive can be added to this adhesive composition in order to increase the tack of the adhesive composition and to improve the handling properties of the composition as a pressure-sensitive adhesive. Examples of the softening agent include phthalic acid derivatives such as di-(2-ethylhexyl) phthalate, mineral oil, vegetable oil, lanolin, liquid polybutene, liquid polyacrylate and the like. These softening agents can be used either singly or in combination. Among these, mineral oil is preferably used as a softening agent in the adhesive composition of the present invention.

The softening agent is used preferably in an amount of 1000 parts by weight or smaller, more preferably in an amount of 300 parts by weight or smaller, based on 100 parts by weight of the block copolymer (a). Amounts of the softening agent greater than 1000 parts by weight based on 100 parts by weight of the block copolymer (a) cause bleeding of the softening agent, so that the resulting adhesive composition has poor quality for the pressure-sensitive adhesive.

Generally, a pressure-sensitive adhesive composition and adhesive goods using a pressure-sensitive adhesive composition such as adhesive tape or adhesive film, are used in various forms and for various applications. They are sometimes required to form temporary adhesion to an adherend and, after use, be peeled off completely; or to form semi-permanent adhesion to an adherend without peeling. Upon preparation of the pressure-sensitive adhesive composition of the present invention, it is necessary to adjust the properties of the composition such as adhesion, tack or cohesion so that the adhesive is suitable for its particular utility by selecting the details, kind or blending ratio of each of the block copolymer (a) and tackifier (b) and, the kind of additional components blended in the composition.

On the other hand, when the adhesive composition of the present invention comprising a block copolymer (a) and a tackifier (b) is used as a hot melt adhesive, a wax can be added to the adhesive composition in order to impart the preferred properties as a hot melt adhesive to the adhesive composition, while diminishing or removing the adhesivity of the adhesive composition at ordinary temperature to make it suitable in handling as a hot melt adhesive; lowering the melt viscosity of the adhesive composition; or adjusting the physical properties of the adhesive composition such as open time, softening temperature, hardness, hot tack or blocking tendency.

As a wax, a wax which has conventionally been employed in hot melt adhesives and which has a melting point ranging from 40° C. to 160° C., is preferred. Examples of such waxes include paraffin wax, microcrystalline wax, Fischer-Tropsch wax, polyethylene wax, modified wax and α-olefin wax, each having a melting point of 40° C. to 160° C. These waxes can be used either singly or in combination. Of the above-exemplified waxes, paraffin wax is preferred in the adhesive composition of the present invention.

The wax is used preferably in an amount of 500 parts by weight or less, more preferably in an amount of 300 parts by weight or less, based on 100 parts by weight of the block copolymer (a). Amounts of the wax greater than 500 parts by weight based on 100 parts by weight of the block copolymer (a) reduce the adhesivity of the resulting adhesive composition.

The adhesive composition of the present invention can contain an additive such as an anti-oxidant or UV absorbent in order to improve heat resistance and weatherability. The adhesive composition of the present invention can also contain a filler such as calcium carbonate or titanium oxide, or a fiber such as glass fiber or organic fiber. Furthermore, the adhesive composition of the present invention can contain another polymer such as unhydrogenated styrene-butadiene block copolymer, hydrogenated styrene-butadiene block copolymer, ethylene-vinyl acetate copolymer or polyolefin.

No particular limitation is imposed on the method for preparation of the adhesive composition of the present invention insofar as it is a method by which the block copolymer (a), the tackifier (b) and additional components are uniformly mixed. These components are subjected to melt mixing by, for example, high-speed mixer, kneader, melting oven, internal mixer or extruder such as monoaxial extruder or biaxial extruder.

The adhesive composition of the present invention can be formulated in a suitable form according to its usage or manner of use. It can be prepared, for example, in the form of block, powder, flake, pellet, rod, film or sheet, and can be used for an adhesive or for the production of various adhesive goods.

The adhesive composition of the present invention can be used, without particular limitation, for the applications similar to those of the conventional hot melt adhesive or hot melt pressure-sensitive adhesive including adhesion to various materials. For example, it can be used for the adhesion of a plastic film or sheet made of polyethylene, polypropylene, polyester or the like, paper, wood, textile goods, metal foil or leather. More specifically, the adhesive composition of the present invention can be used in packaging, such as the manufacture of bags, sealing of small boxes and corrugated board boxes, or the production of cans of aluminum foil; bookbinding; production of plywood; woodworking; making shoes; the production of fiber products such as carpet backing or as a binder of unwoven fabric; the production of various sanitary goods such as paper diaper; adhesive tapes for packaging; wire-insulating tapes and films; adhesive tapes and adhesive sheets for surface protection of various goods; various adhesive films or adhesive sheets used in the semiconductor wafer fabrication process; tying and fixing of pipes or the like; sealants; or adhesives for labels.

In the case where the adhesive composition of the present invention is used as a useless hot melt adhesive, adhesion can be carried out using a conventional applicator for hot melt adhesives by melting the composition by heating, applying the molten adhesive to adherends, and then solidifying the adhesive with the two adherends being attached together.

In the case where the adhesive composition of the present invention is a hot melt pressure-sensitive adhesive, adhesive goods such as adhesive films and adhesive sheets can be prepared by applying a hot melt pressure-sensitive adhesive, in a molten state, to one or both surfaces of a base material such as paper, cloth, plastic film or sheet, or metal foil, to form a layer of the pressure-sensitive adhesive on the base material.

Whether the adhesive composition of the present invention is a hot melt adhesive or hot melt pressure-sensitive adhesive, it can easily be melted generally by heating to about 120° C. to 200° C. and its melt viscosity does not show a large change with differences in temperature. Thus, the adhesive composition of the present invention has good process stability so that it permits smooth adhesion or stable production of adhesive goods such as adhesive films.

The present adhesive composition exhibits excellent properties including process stability, adhesion or tack, cohesion, low temperature characteristics, flexibility, oil resistance and solvent resistance. In addition, the present adhesive composition can be used as a hot melt adhesive or pressure-sensitive adhesive without an organic solvent so that it is free from the problems of air pollution, danger of a fire, worsening of the labor environment or industrial hygiene or the like. Furthermore, it can be used without water so that it does not require any drying time or drying apparatus to make the time for adhesion of adherends or preparation of adhesive goods shorter. Thus, it is also provides excellent energy savings, working properties and productivity.

Other features of the present invention will become apparent in the course of the following descriptions of the exemplary embodiments which are given for illustration of the present invention and are not intended to be limiting thereof.

EXAMPLES

In the following examples, the number-average molecular weight of the block copolymer before hydrogenation, the number-average molecular weight of the butadiene polymer block before hydrogenation, the number-average molecular weight of an isoprene polymer block before hydrogenation or that of a copolymer block of butadiene and isoprene before hydrogenation, the content of block A before hydrogenation in the block copolymer before hydrogenation, the 1,2-bond content in block A before hydrogenation, the degree of hydrogenation of block A and block B, the glass transition temperature of block B and the heat of crystalline fusion of block B are determined as described below.

Number-average molecular weights of block copolymers before hydrogenation, block A before hydrogenation and block B before hydrogenation:

The number-average molecular weight of the block copolymer before hydrogenation was determined in terms of polystyrene gel permeation chromatography (GPC). The number-average molecular weights of block A before hydrogenation and block B before hydrogenation were calculated based on the number-average molecular weight of the block copolymer before hydrogenation and charges of the monomers forming block A and the monomers forming block B, respectively.

Content of block A before hydrogenation in block copolymer

The content of block A before hydrogenation in the block copolymer before hydrogenation was determined from the total charge ($W_A$) of the monomers forming block A and the total charge ($W_3$) of the monomers forming block B in accordance with the following formula:

Content of block A (wt. %)=$[W_A/(W_A+W_B)]\times 100$ wherein $W_A$ means total charge (weight) of the monomers forming block A and $W_B$ means total charge (weight) of the monomers forming block B.

1,2-Bond content of block A before hydrogenation

The block copolymer before hydrogenation was analyzed by $^1$H—NMR and the 1,2-bond content in block A before hydrogenation was calculated.

Degree of Hydrogenation of block A and block B

The block copolymer after hydrogenation was analyzed by $^1$H—NMR and the degrees of hydrogenation of block A and block B were determined.

Glass transition temperature of block B

With DSC (differential scanning calorimetry), the top peak temperature of the differential endothermic curve corresponding to block B of the block copolymer after hydrogenation was found and it was designated as the glass transition temperature of block B.

Heat of crystalline fusion of block B

With DSC (differential scanning calorimetry), the area of the endothermic curve corresponding to block B of the block copolymer after hydrogenation was found. After conversion into the area of the curve per weight of the block copolymer, it was designated as the heat of crystalline fusion of block B.

Reference Example 1

[Preparation of a hydrogenated triblock copolymer]

(1) In a reaction vessel with an internal volume of 5 liter, 3,500, ml of cyclohexane Was charged. After purging with dry nitrogen, 12 g (concentration: 10 wt. %) of a solution of n-butyl lithium in cyclohexane was charged, followed by filling with 90 g of butadiene. The butadiene was polymerized for 2 hours under the conditions of a temperature of 50° C. and a pressure of 1.0 kg/cm$^2$.

(2) Next, 420 g of isoprene was charged into the reaction vessel, followed by polymerization for 5 hours under the conditions of a temperature of 50° C. and a pressure of 1.1 kg/cm².

(3) Furthermore, 90 g of butadiene was charged into the reaction vessel, followed by polymerization for 3 hours under the conditions of a temperature of 50° C. and a pressure of 1.1 kg/cm², to give a triblock copolymer of a butadiene polymer block-isoprene polymer block-butadiene polymer block. Concerning the triblock copolymer obtained, the number-average molecular weight of the block copolymer, the number-average molecular weight of each of the butadiene polymer block and isoprene polymer block, the content of butadiene polymer block in the block copolymer and the 1,2-bond content in the butadiene polymer block were determined in accordance with the above-described methods, respectively. The results are shown in Table 1.

(4) In a reaction vessel with an internal volume of 5 liters, 500 g of the triblock copolymer obtained in the above step (3) was charged, followed by the addition of 5 parts by weight of a hydrogenation catalyst (Raney nickel) per 100 parts by weight of the triblock copolymer. The hydrogenation reaction was conducted for 10 hours under the conditions of a hydrogen pressure of 50 kg/cm² and a temperature of 100° C. to give a hydrogenated triblock copolymer. The hydrogenation ratio of each of the butadiene polymer block and isoprene polymer block in the hydrogenated triblock copolymer obtained and the glass transition temperature and the heat of crystalline fusion of the hydrogenated isoprene polymer block were determined in accordance with the above-described methods, respectively.

The results are shown in Table 1.

Reference Examples 2 and 3
[Preparation of hydrogenated triblock copolymer]

Each of Reference Examples 2 and 3 were conducted in a similar manner to the polymerization steps (1) to (3) of Reference Example 1 except that the amounts of butadiene and isoprene charged to the reaction vessel were changed so that the contents of the butadiene polymer block in the triblock copolymer before hydrogenation are as shown in Table 1; and the polymerization time was changed to 2 hours, 5 hours and 2 hours in the polymerization steps (1) to (3), respectively. The polymerization was conducted to give a triblock copolymer of a butadiene polymer block-isoprene polymer block-butadiene polymer block. Concerning the triblock copolymer obtained, the number-average molecular weight of the block copolymer, the number-average molecular weight of each of the butadiene polymer block. and the isoprene polymer block, the content of the butadiene polymer block in the block copolymer and the 1,2-bond content in the butadiene polymer block are shown in Table 1. The triblock copolymer obtained was then subjected to hydrogenation in a similar manner to the step (4) of Reference Example 1 to give a hydrogenated triblock copolymer. The hydrogenation ratio of each of the butadiene polymer block and the isoprene polymer block in the hydrogenated triblock copolymer, and the glass transition temperature and the heat of crystalline fusion of the hydrogenated isoprene polymer block are shown in Table 1.

Reference Example 4
[Preparation of a hydrogenated triblock copolymer]

Polymerization steps (1) to (3) were conducted similarly to Reference Example 1 except that an equimolar mixture of butadiene and isoprene was used instead of isoprene in the polymerization step (2) described in Reference Example 1; the amounts of butadiene and isoprene charged to the reaction vessel were changed so that the content of the butadiene polymer block in the triblock copolymer before hydrogenation are as shown in Table 1; and the polymerization time was changed to 2 hours, 6 hours and 2 hours in the polymerization steps (1) to (3), respectively. The polymerization was conducted to give a triblock copolymer of a butadiene polymer block-copolymer block of butadiene and isoprene-butadiene polymer block. Concerning the triblock copolymer obtained, the number-average molecular weight of the block copolymer, the number-average molecular weight of each of the butadiene polymer block and the copolymer block of butadiene and isoprene, the content of the butadiene polymer block in the block copolymer, and the 1,2-bond content in the butadiene polymer block are shown in Table 1. The triblock copolymer obtained was subjected to hydrogenation as in the step (4) of Reference Example 1 to give a hydrogenated triblock copolymer. The degree of hydrogenation of each of the butadiene polymer block and the copolymer block of butadiene and isoprene in the hydrogenated triblock copolymer, and the glass transition temperature and the heat of crystalline fusion of the hydrogenated copolymer block of butadiene and isoprene are shown in Table 1.

Reference Example 5

(Preparation of a hydrogenated tetrablock copolymer]

A procedure similar to that of Reference Example 1 was conducted except that the further step of forming an isoprene polymer block [polymerization step (3a)] was carried out after the polymerization steps (1) to (3) of Reference Example 1. The amounts of butadiene and isoprene charged to the reaction vessel were changed so that the content of the butadiene polymer block in the tetrablock copolymer before hydrogenation is as shown in Table 1. The polymerization times were set at 2 hours, 3 hours, 2 hours and 2 hours in the polymerization steps (1) to (3) and (3a), respectively. The polymerization was conducted to give a tetrablock copolymer of a butadiene polymer block-isoprene polymer block-butadiene polymer block-isoprene polymer block. Concerning the tetrablock copolymer obtained, the number-average molecular weight of the tetrablock copolymer, the number-average molecular weight of each of the butadiene polymer block and isoprene polymer block, the content of the butadiene polymer block in the block copolymer, and the 1,2-bond content in the butadiene polymer block are shown in Table 1. The tetrablock copolymer obtained was subject to hydrogenation as in step (4) of Reference Example 1 to give a hydrogenated tetrablock copolymer. The degree of hydrogenation of each butadiene polymer block and isoprene polymer block in the hydrogenated tetrablock copolymer, and the glass transition temperature and the heat of crystalline fusion of the hydrogenated isoprene polymer block (the glass transition temperature and the heat of crystalline fusion here being the mean value of two hydrogenated isoprene polymer blocks) are shown in Table 1.

|  | Reference Example 1 | Reference Example 2 | Reference Example 3 | Reference Example 4 | Reference Example 5 |
|---|---|---|---|---|---|
| symbol of block copolymer | R-1 | R-2 | R-3 | R-4 | R-5 |
| Structure[1] | A-I-A | A-I-A | A-I-A | A-C-A | A-I-A-I |
| Number-Average molecular weight[2] | | | | | |
| Block copolymer | 48000 | 64000 | 74000 | 70000 | 63000 |
| Block A[3] | 7200 × 2 | 9000 × 2 | 18500 × 2 | 10500 × 2 | 9500 × 2 |
| Block B[4] | 33600 | 46000 | 37000 | 49000 | 22000 × 2 |
| Content of Block A (wt. %[5]) | 30 | 28 | 50 | 30 | 30 |
| 1,2-Bond content of block A (mol %) | 7 | 7 | 7 | 7 | 7 |
| Hydrogenation ratio of block A (%) | 99 | 100 | 97 | 100 | 92 |
| Hydrogenation ratio of block B (%) | 98 | 99 | 95 | 100 | 88 |
| Glass Transition Temperature of Block B (°C.) | −53 | −53 | −52 | −51 | −52 |
| Heat of crystalline fusion of block B (cal/g) | less than 0.1 | less than 0.1 | less than 0.1 | 4.2 | less than 0.1 |

[1]Structure:
A-I-A: hydrogenated butadiene polymer block – hydrogenated isoprene polymer block – hydrogenated butadiene polymer block
A-C-A": hydrogenated butadiene polymer block – hydrogenated copolymer block of butadiene and isoprene – hydrogenated butadiene polymer block
A-I-A-I: hydrogenated butadiene polymer block – hydrogenated isoprene polymer block – hydrogenated butadiene polymer block – hydrogenated isoprene polymer block
[2]Number-average molecular weight before hydrogenation
[3]Block A: butadiene polymer block
[4]Block B: isoprene polymer block or copolymer block of butadiene and isoprene
[5]Content of block A before hydrogenation based on the weight of block copolymer before hydrogenation
[6]1,2-Bond content of block A before hydrogenation in the block copolymer before hydrogenation

Example 1

(1) 100 parts by weight of the hydrogenated triblock copolymer obtained in Reference Example 1, 200 parts by weight of a tackifier [alicyclic saturated hydrocarbon resin, "ARKON P-100", tradename; product of ARAKAWA CHEMICAL INDUSTRIES CO., LTD.], 100 parts by weight of a softening agent [mineral oil, "Diana Process Oil PW-90", tradename; product of Idemitsu Kosan Co., Ltd.] and 1 part by weight of an anti-oxidant (hindered phenol type, "Irganox 1010", tradename; product of Ciba-Geigy Inc.] were kneaded at 170° C. using a kneader to have a hot melt pressure-sensitive adhesive composition.

(2) In order to evaluate the process stability of the pressure-sensitive adhesive composition obtained in step (1), supra, the melt viscosities of the pressure-sensitive adhesive composition at 110° C. and 140° were measured by a Brookfield type viscometer to determine a melt viscosity ratio (melt viscosity at 110° C./melt viscosity at 140°). The results are shown in Table 2. The lower the melt viscosity ratio is, the better the handling properties and process stability of the pressure-sensitive adhesive composition are, because a difference in the temperature of the composition does not cause a large change in the melt viscosity of the composition.

(3) The pressure-sensitive adhesive composition obtained in step (1), supra, was heated to 150° C. to melt the same. The molten composition was coated onto one surface of a polyethylene terephthalate film of thickness of 50 μm to give a layer of the composition at a thickness of 50 μm, followed by cooling to room temperature. Thus an adhesive film having the layer of pressure-sensitive adhesive composition on a polyethylene terephthalate film alas prepared.

(4) The tack of the adhesive film obtained in step (3), supra, was determined at a temperature of 25° C. by the ball-tack method in accordance with JIS Z0237. The results are shown in Table 2.

(5) The adhesion of the adhesive film obtained in step (3), supra, was determined in accordance with JIS Z0237 as follows. An adhesive film cut into 10 mm×20 mm sizes was adhered onto a SUS 304 plate (cold-rolled stainless steel plate) and adhesion at the time when it was peeled under the conditions of a temperature of 25° C., a peel angle of 180° and a peel speed of 300 mm/min was determined. The results are shown in Table 2.

(6) The cohesion of the adhesive film obtained in step (3), supra, was determined in accordance with JIS Z0237 as follows. An adhesive film cut into a size of 25 mm×25 mm and was adhered onto a SUS 304 plate and was perpendicularly fixed and maintained. A load of 1 kg was suspended at the lower center of the adhesive film. The time until the adhesive film had peeled off thereby falling down at a temperature of 40° C. was measured, which was designated as cohesion. The results are shown in Table 2.

Examples 2 to 5

(1) The procedures of Examples 2 to 5, were conducted in a similar manner to step (1) in Example 1, except that the hydrogenated triblock copolymers obtained in Reference Examples 2 to 4 and the hydrogenated tetrablock copolymer obtained in Reference Example 5 were used instead of the hydrogenated triblock copolymer obtained in Reference Example 1, the pressure sensitive adhesive compositions were prepared, respectively. The process stability (melt viscosity rate) of each of the compositions was evaluated as in step (2) of Example 1. The results are shown in Table 2.

(2) Adhesive films were prepared in a similar manner to step (3) in Example 1 using pressure-sensitive adhesive compositions obtained in step (1), supra, and their tack, adhesion and cohesion were determined as in the steps (4) to (6) in Example 1. The results are shown in Table 2.

Comparative Example 1

(1) The procedure of this example was conducted in a similar manner to the step (1) in Example 1 except that a commercially-available triblock copolymer of styrene polymer block-hydrogenated isoprene polymer block-styrene polymer block ["SEPTON 2002", tradename; product of Kuraray Co., Ltd.] was used instead of the hydrogenated triblock copolymer obtained in Reference Example 1, and a pressure sensitive-adhesive composition was prepared. The process stability (melt viscosity ratio) of the composition was evaluated as in step (2) in Example 1. The results are shown in Table 2.

(2) In a manner similar to step (3) of Example I, the pressure-sensitive adhesive composition obtained in step (1), supra, was used, and an adhesive film was prepared. The tack, adhesion and cohesion were determined as in steps (4) to (6) in Example 1. The results are shown in Table 2.

the pressure-sensitive adhesive compositions of Examples, 1 to 5 have excellent process stability.

In addition, Table 2 shows that some of the adhesive films using the pressure-sensitive adhesive compositions of Examples 1 to 5 have a small ball-tack, adhesion or cohesion compared with those of the adhesive film using the pressure-sensitive adhesive composition of Comparative Example 1. However, as described before, a pressure-sensitive adhesive composition and adhesive goods such as adhesive tapes and adhesive films using a pressure-sensitive adhesive composition are generally used in various forms or for various applications. Some of them are required to adhere to an adherend temporarily and, after use, to peel off completely. Some of them are required to adhere to an adherend semi-permanently without peeling. It is, therefore, necessary to adjust the adhesion, tack or cohesion, depending on their use or manner of use. It is to be noted that even if the adhesion, ball tack or cohesion of the adhesive films obtained in Examples 1 to 5 happens to be low compared to those of the adhesive film obtained in Comparative Example 1, adhesive films obtained in Examples 1 to 5 are not inferior to those obtained in Comparative Example 1. Adhesive films obtained in Examples 1 to 5 have physical properties sufficient for practical use.

Example 6

(1) To 100 parts by weight of a hydrogenated triblock copolymer obtained in the above Reference Example 1, 100 parts by weight of a tackifier (ester of hydrogenated rosin, "ESTERGUM HI", tradename; product: of ARAKAWA CHEMICAL INDUSTRIES CO., LTD.),

|  | Example 1 | Example 2 | Example 3 | Example 4 | Example 5 | Comparative Example 1 |
| --- | --- | --- | --- | --- | --- | --- |
| [Composition] Base Polymer |  |  |  |  |  |  |
| Kind | R-1 | R-2 | R-3 | R-4 | R-5 | SEPS[1])1 |
| Amount (parts by weight) | 100 | 100 | 100 | 100 | 100 | 100 |
| Tackifier ("ARKON P100") | 200 | 200 | 200 | 200 | 200 | 200 |
| Amount (parts by weight) |  |  |  |  |  |  |
| Softening agent ("Diana Process Oil PW-90") | 100 | 100 | 100 | 100 | 100 | 100 |
| Amount (parts by weight) |  |  |  |  |  |  |
| Anti-oxidant ("Irganox1010") | 1 | 1 | 1 | 1 | 1 | 1 |
| Amount (parts by weight) |  |  |  |  |  |  |
| [Physical properties of pressure-sensitive adhesive composition] Melt viscosity (poise) |  |  |  |  |  |  |
| 140° | 19 | 64 | 60 | 64 | 61 | 27 |
| 110° | 53 | 150 | 180 | 155 | 135 | 150 |
| Melt viscosity ratio (110° C./140° C.) | 2.8 | 2.3 | 3.0 | 2.4 | 2.2 | 5.6 |
| Ball-tack (No.) | 5 | 5 | 2 | 5 | 8 | 8 |
| Adhesion (g/cm) | 450 | 790 | 500 | 800 | 950 | 900 |
| Cohesion (minute) | 215 | 244 | 300 | 242 | 200 | 240 |

[1])SEPS: triblock copolymer of styrene polymer block – hydrogenated isoprene polymer block – styrene polymer block From the results shown in Table 2, it has been found that compared with the pressure-sensitive adhesive composition of Comparative Example 1 using a triblock copolymer of a styrene polymer block-hydrogenated isoprene polymer block-styrene polymer block, the pressure-sensitive adhesive compositions obtained in Examples 1 to 5 using the block copolymers of Reference Examples 1 to 5, respectively, and of the above features (i) to (iv) have a low melt viscosity ratio (melt viscosity at 110° C./melt viscosity at 140° C.) and do not show a large change in melt viscosity with differences in the temperature of the composition. Thus 50 parts by weight of a wax (paraffin wax, "Paraffin Wax 155", tradename; product of NIPPON SEIRO CO., LTD.) and 1 part by weight of an anti-oxidant (hindered phenol type, "Irganox 1010", tradename; product of Ciba-Geigy Inc.) were kneaded at 170° C. using a kneader to give a hot melt adhesive composition. The hot melt adhesive composition obtained did not show tack at normal temperature.

(2) In order to evaluate the process stability of the hot melt adhesive composition obtained in the above step (1) the melt viscosities of the adhesive composition at 110° C. and 140° C. were measured by a Brookfield viscometer to determine the melt viscosity ratio (melt viscosity at 110° C./melt viscosity at 140° C.). The results are shown in Table 3.

(3) The hot melt adhesive composition obtained in step (1), supra, was heated to 150° C. for melting. The molten composition was coated on one surface of an aluminum plate at a thickness of 0.5 mm to give a layer of the composition of thickness of 50 μm. Two such aluminum plates were prepared. These two aluminum plates coated with the composition were laminated with the coated surface(s faced together, followed by adhesion under the conditions of a temperature of 180° C. and pressure-applying time of 1.2 second with a heat sealer ("SG60OR", tradename; product of SHIGA HOSOKI CO., LTD.) to give a laminate.

(4) The adhesion of the laminate obtained in step (3), supra, was determined in accordance with JIS Z0237 as follows. A 90° peel test was conducted at a temperature of 25° C. under the conditions of a peel speed of 300 mm/min to determine the adhesion of the laminate. The results are shown in Table 3.

(5) The hot melt adhesive composition obtained in step (1), supra, was molded into a test piece of 10 mm×60 mm×2 mm in size. The test piece was allowed to stand overnight at a temperature of −15° C. in a refrigerator. Immediately after removal from the refrigerator, the test piece was bent by hands. The test piece which did not crack was evaluated as A and the cracked one was evaluated as B. In this manner, the low temperature characteristics were evaluated. The results are shown in Table 3.

Examples 7 to 10

(1) In Examples 7 to 10, the procedure of step (1) of Example 6 was similarly conducted except that the hydrogenated triblock copolymer obtained in Reference Examples 2 to 4 and the hydrogenated tetrablock copolymer obtained in Reference Example 5 were used instead of the hydrogenated triblock copolymer obtained in Reference Example 1, and hot melt adhesive compositions were prepared, respectively. The process stability (melt viscosity ratio) of each hot melt adhesive composition was evaluated as in the step (2) in Example 6. The results are shown in Table 3.

(2) Laminates were prepared in a similar manner to the step (3) in Example 6 using the hot melt adhesive composition obtained in step (1), supra. Their adhesivities were measured as in the step (4) in Example 6. The results are shown in Table 3.

(3) Test pieces were prepared in a similar manner to the steps (5) in Example 6 using the hot melt adhesive compositions obtained in step (1), supra. Their low temperature characteristics were evaluated as in the steps (5) in Example 6. The results are shown in Table 3.

Comparative Example 2

(1) A procedure similar to step (1) in Example 6 was conducted except that a commercially available ethylene-vinyl acetate copolymer [product of Du-PONT MITSUI POLYCHEMICALS CO., LTD.] was used instead of the hydrogenated triblock copolymer obtained in Reference Example 1, and a hot melt adhesive composition was prepared. The process stability (melt viscosity ratio) of the composition was evaluated as in the step (2) in Example 6. The results are shown in Table 3.

(2) A procedure similar to step (3) in Example 6 was conducted except that the hot melt adhesive composition obtained in the above step (1) was used, and a laminate was prepared. Its adhesion was measured as in step (4) in Example 6. The results are shown in Table 3.

(3) A procedure similar to step (5) in Example 6 was conducted except that the hot melt adhesive composition obtained in the above step (1) was used, and a test piece was prepared. Its low temperature characteristics were evaluated as in step (5) in Example 6. The results are shown in Table 3.

|  | Example 6 | Example 7 | Example 8 | Example 9 | Example 10 | Comparative Example 2 |
| --- | --- | --- | --- | --- | --- | --- |
| [Composition] Base Polymer |  |  |  |  |  |  |
| Kind | R-1 | R-2 | R-3 | R-4 | R-5 | EVA[1] |
| Amount (parts by weight) | 100 | 100 | 100 | 100 | 100 | 100 |
| Tackifier ("ESTERGUM H") Amount (parts by weight) | 100 | 100 | 100 | 100 | 100 | 100 |
| Wax ("Paraffin Wax 155")[3] Amount (parts by weight) | 50 | 50 | 50 | 50 | 50 | 50 |
| Anti-oxidant ("Irganox1010") Amount (parts by weight) | 1 | 1 | 1 | 1 | 1 | 1 |
| [Physical properties of pressure-sensitive adhesive composition] Melt viscosity (poise) |  |  |  |  |  |  |
| 140° | 100 | 280 | 270 | 290 | 250 | 170 |
| 110° | 230 | 690 | 760 | 690 | 570 | 520 |
| Melt viscosity ratio (110° C./140° C.) | 2.3 | 2.5 | 2.8 | 2.4 | 2.3 | 3.0 |
| Adhesion (g/cm) | 150 | 180 | 250 | 170 | 160 | 200 |
| Low temperature characteristics | A | A | A | A | A | B |

[1] EVA: ethylene-vinyl acetate copolymer ("EVA250", product of Du-PONT MITSUI POLYCHEMICALS CO., LTD.)
[2] Ester of hydrogenated rosin ("ESTERGUM h", tradename; product of ARAKAWA CHEMICAL INDUSTRIES CO., LTD.)
[3] Paraffin wax ("Paraffin Wax 155", tradename; product of NIPPON SEIRO CO., LTD.)
[4] Hindered phenol type (product of Ciba-Geigy, Inc.)

From the above results shown in Table 3, it has been found that the hot melt adhesive compositions in Examples 6 to 10 using the block copolymers of Reference Examples 1 to 5, respectively, and of the above features (i) to (iv) have excellent process stability as indicated by low melt viscosity ratios (melt viscosity at 110° C./melt viscosity at 140° C.). It has also been found that, compared with the hot melt adhesive composition of Comparative Example 2 using an ethylene-vinyl, acetate copolymer, the hot melt adhesive compositions obtained in Examples 6 to 10 have excellent low temperature characteristics so that they can be used satisfactorily at low temperature.

Example 11

(1) A procedure similar to step (1) in Example 6 was conducted except that the paraffin wax was not used, and a hot melt adhesive composition was prepared. Its process stability was evaluated as in step (2) in Example 6 and it was found that its melt viscosity ratio (melt viscosity at 110° C./melt viscosity at 140° C.) was 2.3.

(2) A procedure similar to step (3) in Example 6 was followed except that the hot melt adhesive composition obtained in step (1), supra, was used, and a laminate was prepared. Its adhesion was measured as in step (4) in Example 6 to be 130 g/cm.

(3) A test piece was prepared in a manner similar to step (5) in Example 6 except that the hot melt adhesive composition obtained in the above step (1) was used. Its characteristics at low temperature were evaluated as in step (5) in Example 6. No cracks were found in the test piece.

(4) A procedure similar to step (3) in Example 1 is followed except that the hot melt adhesive composition obtained in step (1), supra, was used and an adhesive film was prepared. Its tack, adhesion and cohesion were determined as in steps (4) to (6) in Example 1. As a result, it has been found that the ball tack (No.) of the composition was 5, the adhesion of the composition was 200 g/cm and the cohesion of the composition was 400 minutes. Thus the adhesive composition obtained in Example 11 exhibits excellent process stability and low temperature characteristics. It has also been found that the adhesive composition obtained in Example 11 can be used sufficiently as a hot melt pressure-sensitive adhesive or hot melt adhesive.

Obviously, numerous modifications and variations are possible in light of the above teachings. It is, therefore, to be understood that within the scope of the appended claims the present invention can be practiced otherwise than as specifically described herein.

What is claimed as new and is desired to be secured by Letters Patent of the United States is:

1. A hot melt or hot melt pressure-sensitive adhesive composition which comprises a hydrocarbon block copolymer (a) and a tackifier (b) in an amount of 10 to 2000 parts by weight based on 100 parts of block copolymer (a), wherein (i) said block copolymer (a) has at least one polymer block A comprising a hydrogenated butadiene polymer and at least one polymer block B comprising a polymer substantially having an olefin polymer structure different from polymer block A and said block copolymer (a) has a structure represented as follows $A\text{-}(B\text{-}A)_p$,
   $B\text{-}(A\text{-}B)_q$ or
   $(A\text{-}B)_r$ wherein A and B are blocks A and B; and p and q each are an integer 1 or greater and r is an integer greater than 1;

(ii) said polymer block A in the block copolymer (a) is a hydrogenated butadiene polymer block having a 1,2-bond content of 20 mol % or less before hydrogenation and a degree of hydrogenation of not lower than 80%;

(iii) said polymer block B in the block copolymer (a) has a glass transition temperature of −20° C. or less and a heat of crystalline fusion of 8 cal/g or lower; and is a polymer selected from the group consisting of poly(α-olefin)s, and hydrogenated polymers of conjugated dienes wherein the degree of hydrogenation of said conjugated diene polymers is not lower than 80%; and (iv) the block copolymer (a) contains the polymer block A before hydrogenation in an amount of 3 wt. % to 80 wt % based on the weight of the block copolymer (a) before hydrogenation, the balance being polymer block B.

2. The hot melt or hot melt pressure-sensitive adhesive composition of claim 1, wherein said block copolymer (a) has a structure represented as follows $(A\text{-}B)_r$ where, A, B and r are defined as in claim 1.

3. The composition of claim 1 wherein the hot melt or hot melt pressure sensitive adhesive composition is so formulated that the ratio of the melt viscosity of the composition at 110° C. to that at 140° C. is 2.2 to 3.0.

4. The composition of claim 3 wherein the polymer block B is a hydrogenated isoprene polymer or a hydrogenated copolymer of isoprene and butadiene.

5. The composition of claim 1 wherein the polymer block B is a hydrogenated isoprene polymer or a hydrogenated copolymer of isoprene and butadiene.

6. The hot melt or hot melt pressure-sensitive adhesive composition of claim 1, wherein said block copolymer (a) has a structure represented as follows $A\text{-}(B\text{-}A)_p$ or
   $B\text{-}(A\text{-}B)_q$ where A, B, p and q are defined as in claim 1.

7. The composition of claim 6 wherein the hot melt or hot melt pressure sensitive adhesive composition is so formulated that the ratio of the melt viscosity of the composition at 110° C. to that 140° C. is 2.2 to 3.0.

8. A hot melt or hot melt pressure-sensitive adhesive composition which comprises a block copolymer (a) which does not have an epoxy group and a tackifier (b) in an amount of 10 to 2000 parts by weight based on 100 parts of block copolymer (a), wherein (i) said block copolymer (a) has at least one polymer block A comprising a hydrogenated butadiene polymer and at least one polymer block B comprising a polymer substantially having an olefin polymer structure different from polymer block A and said block copolymer (a) has a structure represented as follows $A\text{-}(B\text{-}A)_p$,
   $B\text{-}(A\text{-}B)_q$ or
   $(A\text{-}B)_r$ wherein A and B are blocks A and B; and p and q each are an integer 1 or greater and r is an integer greater than 1;

(ii) said polymer block A in the block copolymer (a) is a hydrogenated butadiene polymer block having a 1,2-bond content of 20 mol % or less before hydrogenation and a degree of hydrogenation of not lower than 80%;

(iii) said polymer block B in the block copolymer (a) has a glass transition temperature of −20° C. or less and a heat of crystalline fusion of 8 cal/g or lower; and is a polymer selected from the group consisting of poly($\alpha$-olefin)s, and hydrogenated polymers of conjugated dienes wherein the degree of hydrogenation of said conjugated diene polymers is not lower than 80%; and (iv) the block copolymer (a) contains the polymer block A before hydrogenation in an amount of 3 wt. % to 80 wt % based on the weight of the block copolymer (a) before hydrogenation, the balance being polymer block B.

* * * * *